United States Patent [19]

Brewer et al.

[11] Patent Number: 5,347,628
[45] Date of Patent: Sep. 13, 1994

[54] METHOD OF GRAPHICALLY ACCESSING ELECTRONIC DATA

[75] Inventors: Susan C. Brewer, Keller; Kathy A. Brink, Coppell; William H. Krebs, Jr., Euless; Robert P. Welch, Colleyville, all of Tex.

[73] Assignee: International Business Machines Corporation, Armonk, N.Y.

[21] Appl. No.: 467,697

[22] Filed: Jan. 18, 1990

[51] Int. Cl.⁵ .............................................. G06F 15/62
[52] U.S. Cl. ................................. 395/159; 395/155; 395/156; 395/157
[58] Field of Search ............... 395/155, 156, 157, 159; 364/140, 141

[56] References Cited

U.S. PATENT DOCUMENTS

| | | | |
|---|---|---|---|
| 4,601,003 | 7/1986 | Yoneyama et al. | 395/159 |
| 4,789,962 | 12/1988 | Berry et al. | 395/155 |
| 4,831,556 | 5/1989 | Oono | 395/157 |
| 5,001,697 | 3/1991 | Torres | 364/521 |
| 5,021,976 | 6/1991 | Wexelblat et al. | 364/521 |
| 5,119,476 | 6/1992 | Texier | 395/157 |

OTHER PUBLICATIONS

"Virtual Office Desktop Drawers", Research Disclosure No. 305, Sep. 1989, p. 651.
"Showman, An Object-Based User Interface for the HP New Wave Environment", Hewlett-Packard Journal, vol. 40, No. 4, Aug. 1989, pp. 9–17.
Rader "Programming-in-Pictures: Implications on Software Technology" IEEE Computer Society, Aug. 1985, pp. 335–343.

Primary Examiner—Heather R. Herndon
Assistant Examiner—Joe Feild
Attorney, Agent, or Firm—Jonathan E. Jobe, Jr.

[57] ABSTRACT

A computer system user interface that includes a method of accessing electronic data. The method includes displaying on a computer display screen a control window that includes a perspective view of a work area. The work area includes at least one animated icon that is movable from a closed position to a substantial continuum of open positions. Moving the icon to an open position automatically opens a window on the display screen that contains the data to be accessed. Closing the icon automatically closes the window.

15 Claims, 4 Drawing Sheets

METHOD OF GRAPHICALLY ACCESSING ELECTRONIC DATA

BACKGROUND OF THE INVENTION

1. Field of the Invention

The present invention relates generally to user interfaces for data processing systems and, more particularly, to a method of graphically accessing electronic data by the manipulation of animated icons.

2. Description of the Prior Art

User interfaces allow the computer user to interact or communicate with the computer system. User interfaces are typically implemented with a display screen and an entry device, such as a keyboard, mouse, light pen or the like. The display screen displays information and data to the user and the user uses the entry device to give commands and provide information to the computer system.

Relatively low level user interfaces are word or character oriented. In such user interfaces, the user is required to know or have readily available various commands and operators in order to work with the system. Such low level user interfaces also require the user to know various rules of syntax and have some knowledge of the structure of the underlying application. Low level user interfaces are not user friendly.

Some higher level user interfaces include various menus and prompts. Such interfaces provide the user with limited choices and they ask the user for information. Such user interfaces are somewhat automated and they require less skill on the part of the user. However, such user interfaces are language intensive, so they require a certain level of literacy on the part of the user. Also, substantial effort and expense are required to adapt such user interfaces to different national languages.

Recently, as more and more people want and need to use the power of the computer in their daily work but do not have the time to develop the specialized data processing skills required to define information or communication requirements, even higher level user interfaces have been developed. One such high level user interface presents the user with windows and icons. Windows usually include a title bar, an action bar, and a client area. The title bar identifies the window. It may also have some standard action areas that allow the user to maximize or minimize the size of the window and to scroll the data within the window. The action bar lists a set of actions that can be selected, such as style, edit, view, or help.

The main client area of the window may be populated with icons, which are small stylized representations of the objects with which the user works. By using a mouse, the user can move the icons around by dragging them. Dragging may be done, for example, by operating the mouse to point to the icon, holding down one of the mouse buttons, which effectively grabs the icon, and moving the mouse around. Dragging one object and laying it on top of another object is one form of direct manipulation. Dragging an object to a printer icon, for example, tells the system to print whatever the object represents. Dragging an object to a file cabinet icon instructs the system to file the object. Some icons represent individual objects, for example, a document or a telephone. Other icons represent containers, for example, a file cabinet or a mail basket, which can contain other objects.

Iconographic user interfaces are an improvement over the lower level user interfaces. However, presently existing iconographic interfaces do have some shortcomings. For example, the operations with the icons are not completely intuitive. The beginning user must resort to online helps and tutorials, including help windows, in order to operate the system. Also, such user interfaces rely extensively upon textual material in the form of pull-down and pop-up menus. User literacy and national language support problems still exist in such user interfaces.

A further shortcoming of the presently existing iconographic user interfaces, as well as the menu driven interfaces, is in the number of manipulative steps by the user and getting into and out of the data. If the user wishes to inspect the contents of a particular file, the user must open the window for that file to display its contents. If, after having looked at the contents of the file, the user wishes not to work with the contents of the file, the user must go to that file's window and perform various non-intuitive closing operations before returning to the main window.

SUMMARY OF THE INVENTION

The present invention provides an aesthetically pleasing user interface that intuitively reflects the functions being provided and, through the use of animated icons, more closely simulates the functions being shown. By animating icons of things that open, such as doors, drawers, notebooks, and the like, the user will be able to move the icon and open an object represented by the icon and see at a glance what is contained in or behind the icon. Also, the user is able to move the icon and close the object represented by the icon without needing to step through menu bars, pulldowns, or other commands. The elimination of menus, the ease of backing out of a choice by simply closing an icon and the intuitive usefulness of the user interface of the present invention take the user interface a step beyond presently existing user interfaces. The real-time iconic animation gives a feeling of reality to the interface, which increases the user's comfort level. Without words, the interface can be used around the world without needing translation. The animated icons that cause actions to occur are virtually self-explanatory, which greatly reduces the need for tutorials, training manuals, or helps.

Briefly stated, the method of the present invention includes displaying on a computer screen a graphical representation of a work area. The work area includes at least one animated icon that is movable between a closed position and an open position. The icon is positioned in a contextual setting. For example, the icon may be a drawer in a perspective view of a desk in an office. The method includes manipulating a pointing device to move the icon to an open position. Such movement of the icon automatically displays the contents of the icon on the screen. In the preferred embodiment, moving the icon automatically opens a window on the screen. The data being accessed is displayed in the data window. The size of the data window is controlled by the position of the icon. When the icon is closed, the window is closed. Similarly, when the icon is fully opened, the window is at its maximum size. If the user wants simply to see what is in the drawer icon, the user opens the drawer slightly, which opens the window slightly so that the user can look at the data. If the user is finished or does not wish to work with the data in the drawer, the user simply closes the drawer and the data window disappears.

DESCRIPTION OF THE PREFERRED EMBODIMENT

Figure 1:
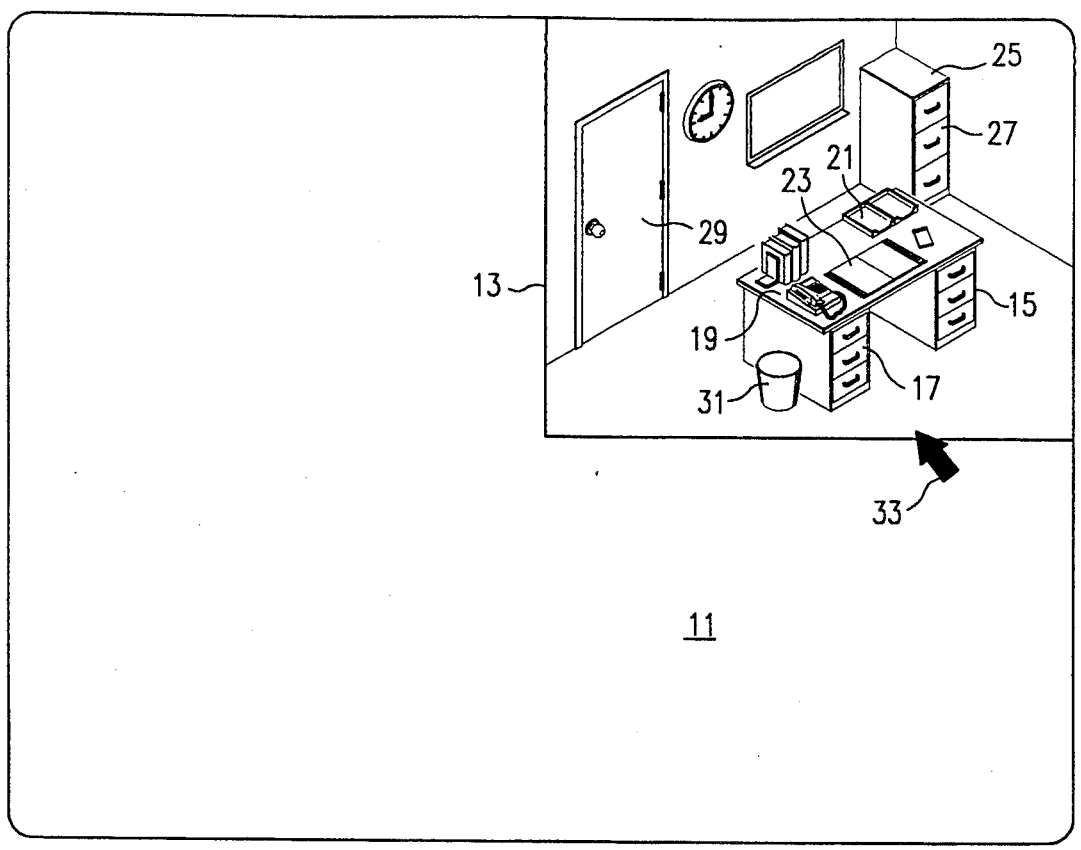
FIG. 1 is a pictorial representation of a computer screen showing all animated icons of the present invention in their closed positions.

Referring now to the drawings, and first to FIG. 1, a computer display screen is designated generally by the numeral 11. Screen 11 has displayed thereon a control window 13. In the preferred embodiment of the present invention, control window 13 includes a perspective graphical representation of an office. The office of control window 13 includes a desk 15 having drawer icons 17, and a desktop 19 having thereon various icons such as in/out basket icons 21, a calendar icon 23, and the like. The office of control window 13 also includes a file cabinet 25 having drawer icons 27, a door icon 29, and a trash can icon 31.

Control window 13 thus includes a plurality of icons. However, the icons of the present invention are displayed in a contextual environment rather than on a "parking lot", as in the prior art. The contextual presentation of the icons of the present invention appeals to the user's intuition. The user, relying on his or her experience with offices in the real world, will feel at home with the control window display of the present invention without needing labels or other textual instructions. The user can customize the "office" of the control window and can put various data, including files, applications, etc., in the drawers of his or her choosing. The graphical presentation of the present invention eliminates the need for national language support.

Display screen 11 also has thereon a cursor 33 that is controlled by a mouse (not shown). Mouse operated cursors are well known to those skilled in the art. The user can move the mouse around on a surface and cause the cursor to move about display screen 11. The mouse includes buttons that enable the user to manipulate and do other operations with icons on the screen, all as is well known to those skilled in the art.

Figure 2:
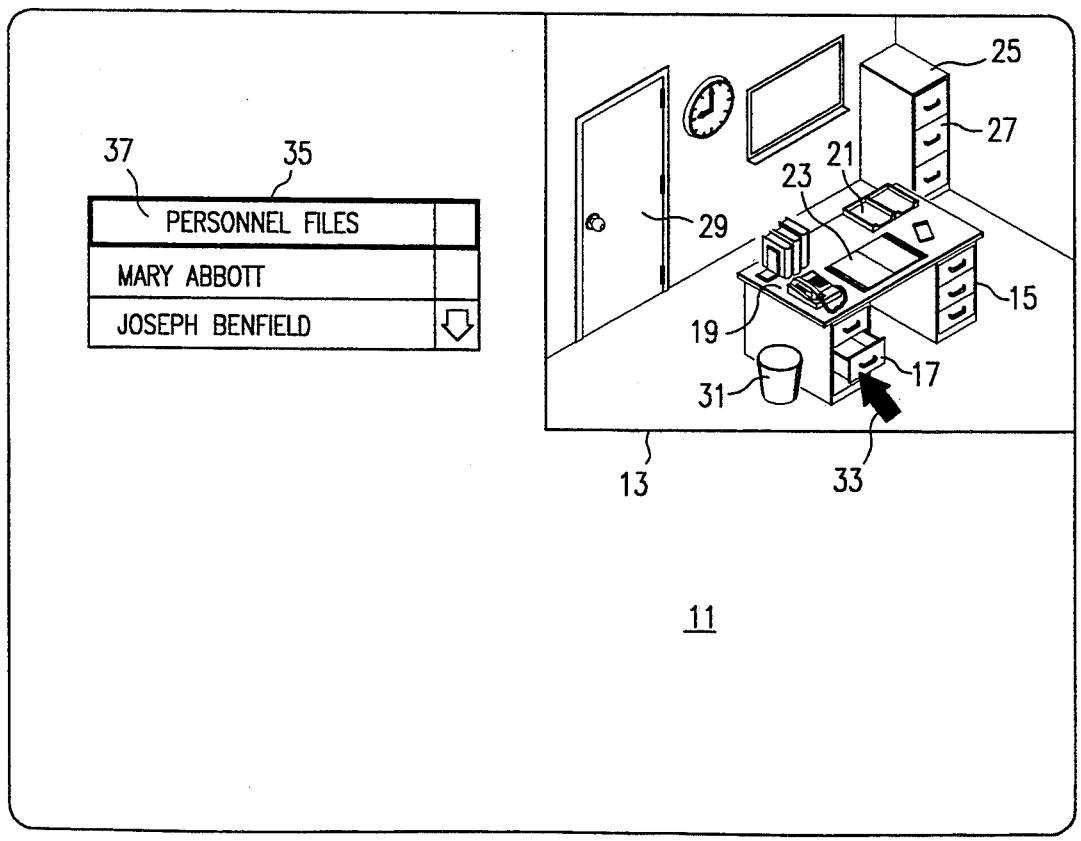
FIG. 2 is a pictorial representation of a computer screen showing one of the animated icons of the present invention in a partially opened position.

In FIG. 2, the user has selected or "grabbed" drawer 17 with cursor 33 and has "dragged" or "pulled" drawer 17 to a partially open position. The "grabbing" operation is performed by placing the head of the cursor 33 on drawer 17, depressing one of the buttons of the mouse, and keeping the mouse button depressed while moving the mouse.

Movement of drawer 17 to the partially opened position has caused a window 35 to be displayed in a partially open position on display screen 11. Window 35 contains a list of data that represents the contents of drawer 17. Drawer 17 contains personnel files, as shown by the label bar 37 in window 35. Label bar 37 is followed by a list of the files contained in drawer 17.

Figure 3:
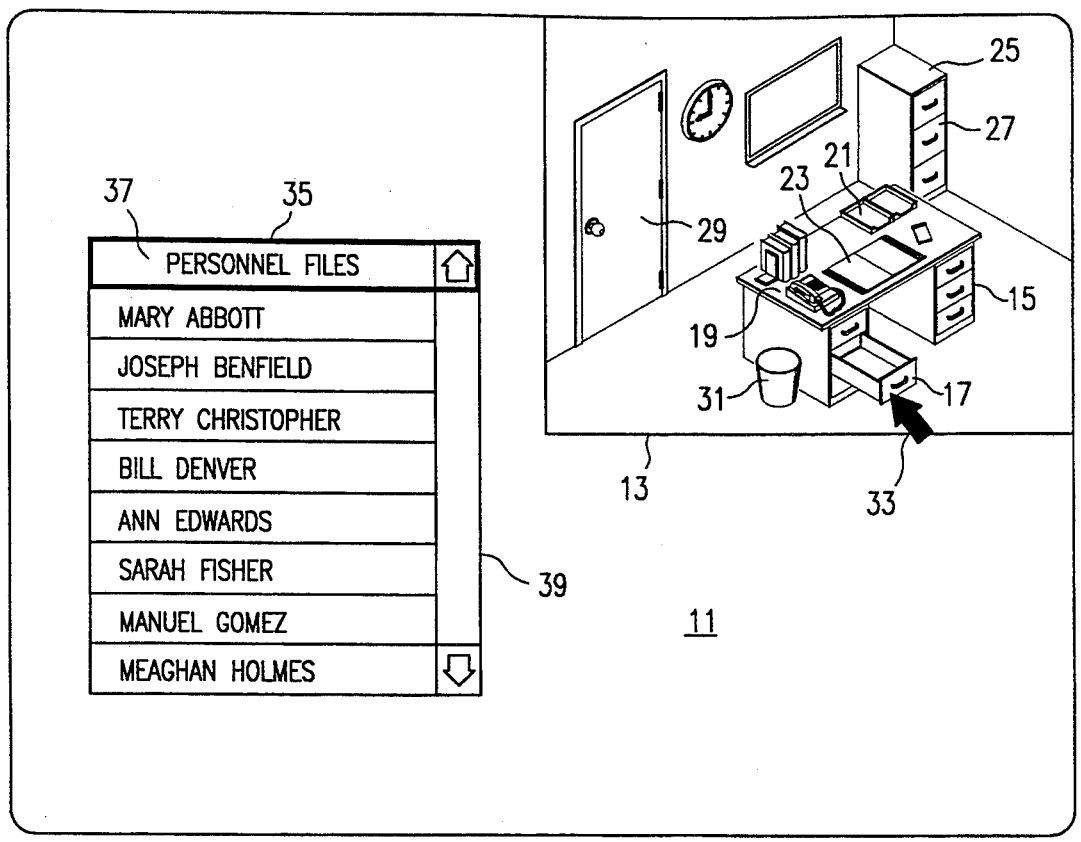
FIG. 3 is a pictorial representation of a computer screen with an animated icon of the present invention in its fully open position.

If the user wishes to work with one of the files in drawer 17, he or she can pull the drawer open until the file that he or she is interested in appears in window 35, as shown in FIG. 3. Since the "electronic office" of the present invention allows a user to place more files in a drawer than could be placed in a real drawer, window 35 includes a scroll bar 39 that enables the user to scroll the files listed in window 35 when window 35 is fully opened. The user can move cursor 33 to window 35 to select the file of interest. When the user is finished looking at the contents of the drawer 35, he or she simply operates cursor 33 to move drawer 17 to its closed position, as shown in FIG. 1.

Figure 4:
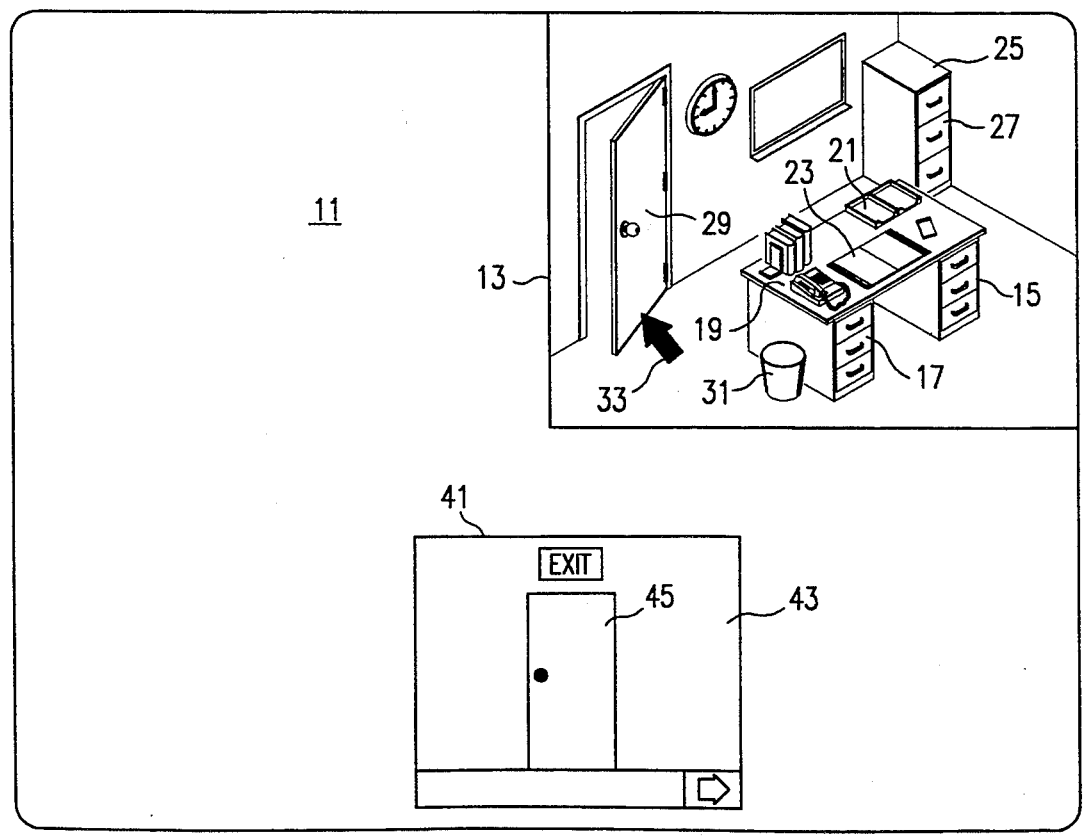
FIG. 4 is a pictorial representation of a computer screen showing an alternative embodiment of the present invention.
Figure 5:
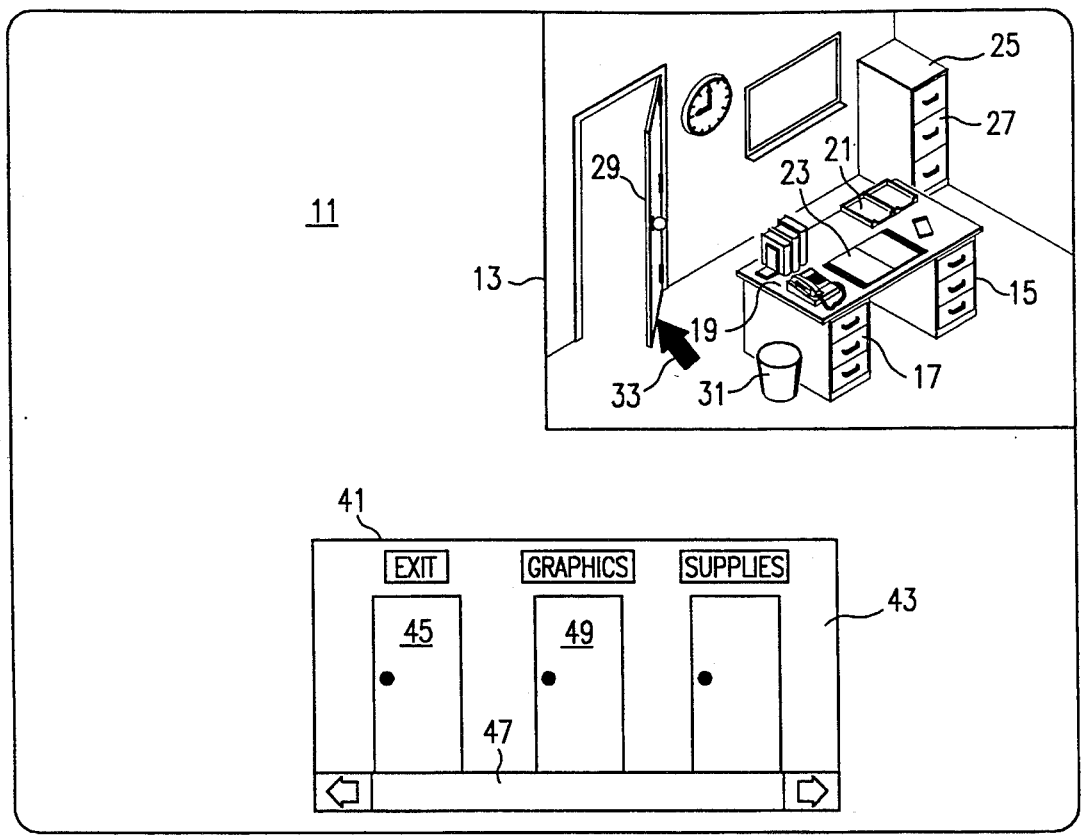
FIG. 5 is pictorial representation of the embodiment of FIG. 4 with a door icon in its fully open position.

Turning now to FIG. 4, the user has operated cursor 33 to "open" slightly door 29. As door 29 is pulled to the left, it begins to open, the opening of door 29 causes a window 41 to be displayed on display screen 11. The data displayed in window 41 includes a hallway 43 with doors, including an exit door 45. The user can operate cursor 33 to open exit door 45 to return to the base operating system. The user can operate cursor 33 to move office door 29 to its fully open position, as shown in FIG. 5. When office door 29 is fully open, several doors are displayed in hallway 43 of window 41. Window 41 includes a scroll bar 47 that enables the user to "walk" up and down hall 43 to view other doors.

Figure 6:
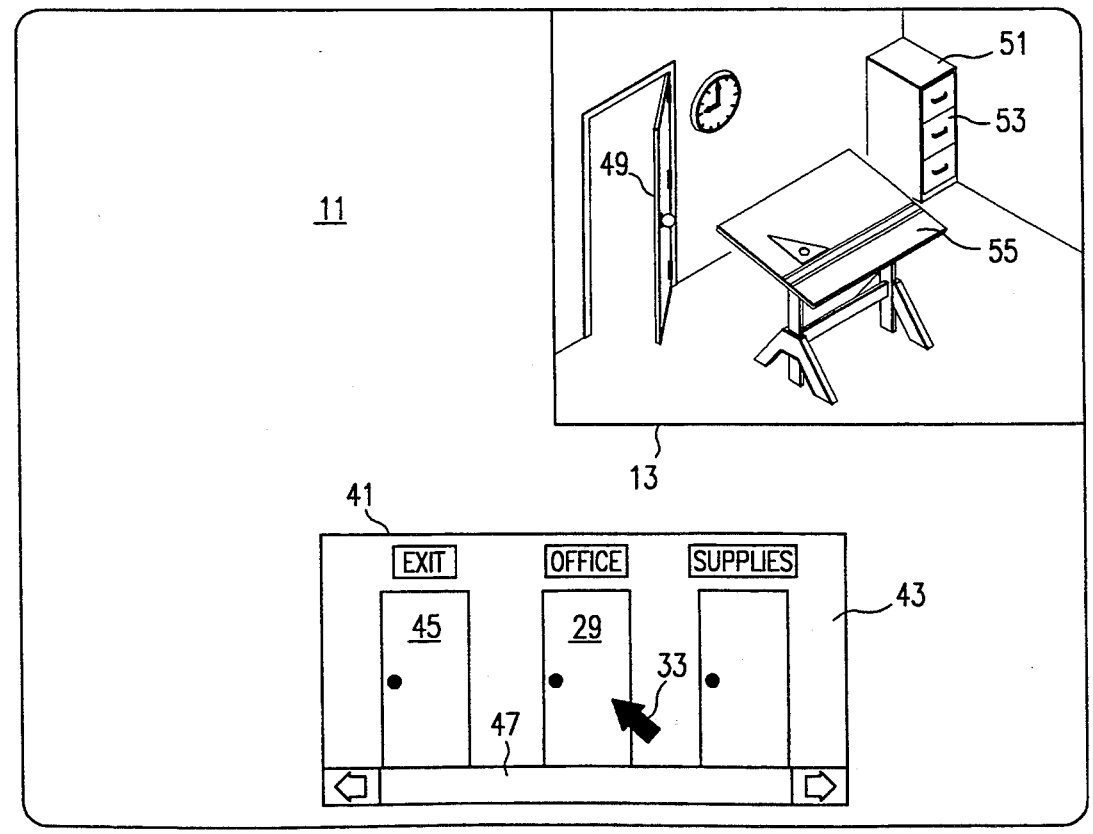
FIG. 6 is a pictorial representation of the computer screen of the alternative embodiment after having selected the graphics door.

The doors in hallway 43 lead to rooms that contain icons that represent other files and applications. For example, the user can move cursor 33 to hallway window 41 and select the door 49 to a graphics room. The user makes the selection by placing the head of cursor 33 on door 49 and clicking one of the mouse buttons. As shown in FIG. 6, after selection of the graphics door, the scene in control window 13 changes to a perspective view of a graphics room, which includes, for example, a file cabinet 51 with drawer icons 53, a drafting table icon 55, which might represent a plotter application, and other application icons. The scene in hallway window 41 also changes to include office door 29. The user can select icons in control window 13 with cursor 33. The user can return to the office control window by selecting office door 29 and hallway window 41. Such selection would return display screen 11 to the condition shown in FIG. 5. The user can also exit the program or go to other rooms by selecting the appropriate door in hallway window 41 of FIG. 6.

Figure 7:
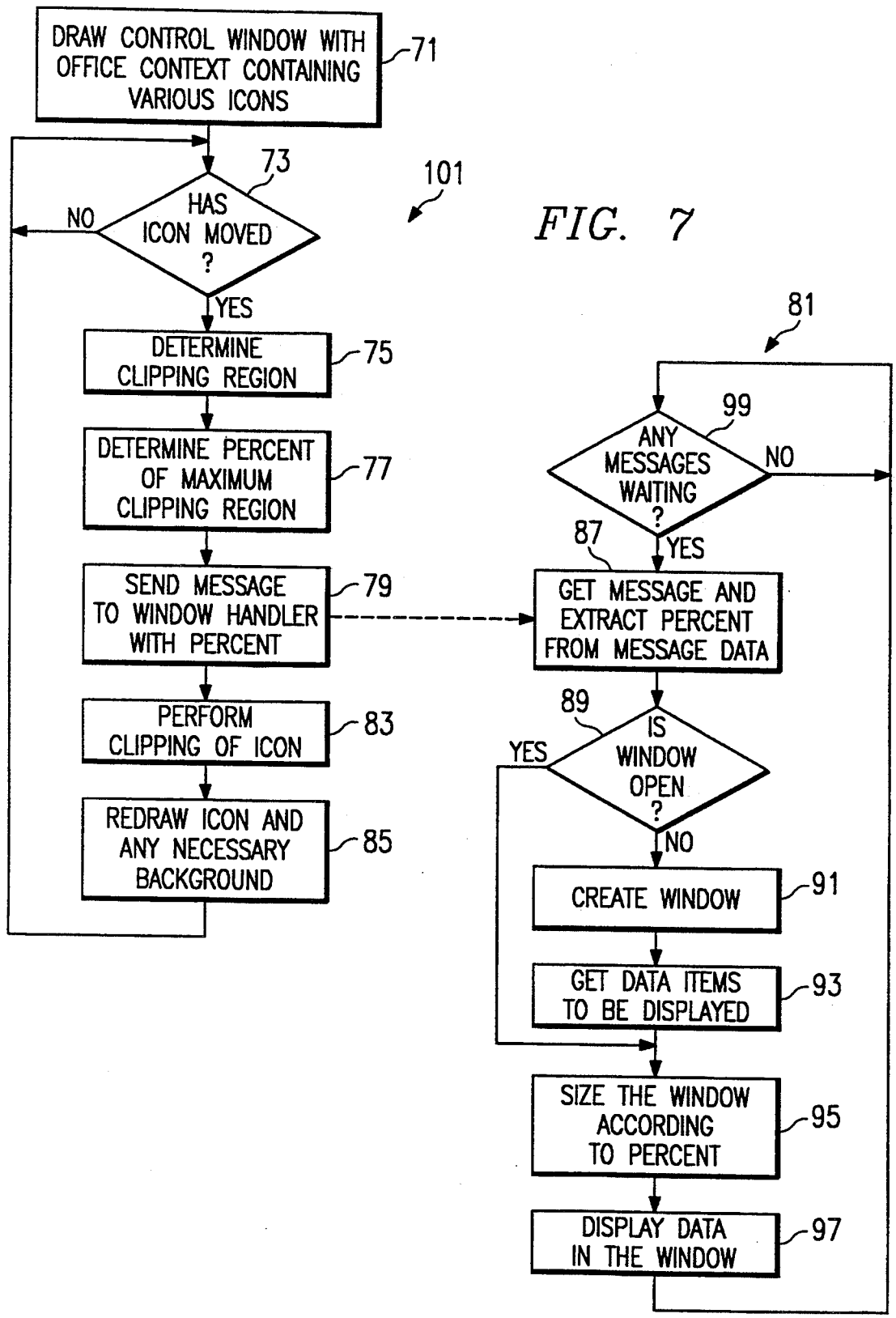
FIG. 7 is a flow chart setting forth the implementation of the method of the present invention.

Referring to FIG. 7, there is shown a flow chart of the software implementation of the animated icons of the present invention. Block 71 includes the steps of drawing the control window with office context containing various icons. The animated icons of the present invention may be drawn in alternative ways. One way is to take as input a graphics segment for the icon. The graphics segment would be transformed into a bitmat representation which could then be BIT BLTed very rapidly onto the background layout. Before BIT BLTing, the bitmap could be clipped in ways that would make it appear to be movable as consecutive cycles show the icon smoothly moving. The other way would take as input a bitmap. It would then follow all the procedures outlined above. The weakness of this method or more positively the strength of the graphics segment method is that graphic segments are scalable or sizable whereas bitmaps are much less so. The graphics segment method would thus be much more generic and useful in today's world of scalable windows.

After the controlled window has been drawn, the input is monitored. As shown at decision block 73, if the icon does not move, nothing happens. The icon moves if the cursor is on the icon, the mouse button is depressed, and the mouse is moved. Moving icons is well known to those skilled in the art and it is controlled by an operating system, such as Presentation Manager. If the icon has moved, then, referring to block 75, the clipping region of the display is determined. The clipping region determines the amount of the icon that is visible on the display. Referring, for example, to FIGS. 1 and 3, in FIG. 3, drawer icon 17 is pulled all the way open and it is completely visible. In FIG. 1, drawer icon 17 is closed, but it still exists; most of the drawer is covered over by the background of the desk.

Returning to FIG. 7, after the clipping region has been determined, then, as shown in block 77, the percentage of the maximum clipping region is determined. After the percentage of the maximum clipping region has been determined, as shown in block 79, a message with that percent is sent to the window handler program, which is designated generally by the numeral 81.

After the message is sent, the program clips the icon at block 83 and redraws the icon and any necessary background at block 85. After the icon has been redrawn, the program continues to monitor the input.

The message handler program 81 receives the message and extracts the percent of maximum clipping region from the message data at block 87. If, as shown at decision block 89, the window is closed, the program creates the window, at block 91, and gets the data items to be displayed, at block 93. After the window has been created and the data items have been fetched, then, as shown in block 95, the window is sized according to the percent of maximum clipping region. If the window is already opened, the program skips over the window creation and data item fetching steps. Referring to block 97, after the window has been sized, the data is displayed in the window. Then, as shown in decision block 99, the window handler program waits until it receives another message. The control window animation routine, which is designated generally by the numeral 101, operates independently of window handler routine 81. Animation routine 101 passes messages to window handler program 81.

The animated icons of the present invention offer several advantages of the prior art. One advantage is the elimination of the need for pull downs and menu bars in the main controlling window. The actions taken on the animated icons in the control window are reflected both in the changing picture in the control window and the resulting actions displayed on the main screen. Actions are simplified. In the control window, only open, close, and drop actions are accomplished. In the main display, move, arrange or delete work is done. Deleting may be accomplished by dragging a file selected in the main display into the office and dropping it into the trash can icon. When an object is pulled across the boundary from the main display to the control window, the object may be changed to an icon that is sized to fit in the window environment. The ability to cross the boundary between the two display areas gives the animated control window the power and flexibility to meet a variety of tasks without the need for any words.

The elimination of pull-down and pop-up menus, the ease of "backing out" of a choice by simply "sliding" an icon to its closed position, and the intuitive usefulness of the design make the present invention a step beyond menu-bar/pull-down oriented interfaces. The real-time iconic animation gives a feeling of reality to the interface, thereby increasing the user's comfort level. Without words, the interface can be used around the world without needing translation. The animated icons that cause actions to occur in the main window are virtually self-explanatory, thereby greatly reducing the need for tutorials, training manuals, or helps.

While the invention has been particularly shown and described in with reference to a preferred embodiment, it will be understood by those skilled in the art that various changes in form and detail may be made without departing from the spirit and scope of the invention.

What is claimed is:

1. A method in a data processing system, including a display screen and a user operated device, for graphically accessing electronic data, which comprises the steps of:
   displaying on said screen a graphical representation of a work area, said work area including at least one icon that is movable in said representation of said work area between a closed position and an open position;
   operating said device to move said icon to an open position;
   automatically opening a window on said screen in response to moving said icon to said open position while said icon and representation of said work area remain visible on said screen; and displaying said data in said window.

2. The method as claimed in claim 1, including the steps of:
   operating said device to move said icon to a second open position; and
   automatically changing the size of said window in response to moving said icon to said second open position.

3. The method as claimed in claim 1, including the steps of:
   operating said device to move said icon to said closed position; and
   automatically closing said window in response to moving said icon to said closed position.

4. The method as claimed in claim 1, wherein said representation of said work area is displayed in a first portion of said screen and said window is displayed in a second portion of said screen.

5. A method in a data processing system, including a display screen, for graphically accessing electronic data, which comprises the steps of:
   displaying on said screen a graphical representation of a work area, said work area including at least one icon that is movable in said work area between a closed position and an open position;
   moving said icon to a position;
   displaying on said screen a window while said icon and work area remain visible on said screen, the size of said window being related to the position of said icon with respect to said closed position; and
   displaying said data in said window.

6. The method as claimed in claim 5, wherein said icon represents a drawer having contents.

7. The method as claimed in claim 6, wherein said data includes a list of the contents of said drawer.

8. The method as claimed in claim 5, wherein said icon represents a door.

9. The method as claimed in claim 8, wherein said data includes a plurality of door icons.

10. The method as claimed in claim 5, wherein said graphical representation of said work area includes a perspective view of an office including office furnishings.

11. The method as claimed in claim 5, wherein said graphical representation is displayed on a first portion of said screen and said window is displayed on a second portion of said screen.

12. The method as claimed in claim 5, wherein said icon has a fully open position.

13. The method as claimed in claim 12, wherein when said icon is in said fully open position, said window is fully open.

14. The method as claimed in claim 12, wherein when said icon is in said closed position, said window is closed.

15. The method as claimed in claim 12, wherein said icon is movable to any intermediate position between said closed and fully open positions.

* * * * *